(12) United States Patent
Zhao et al.

(10) Patent No.: US 12,547,150 B2
(45) Date of Patent: Feb. 10, 2026

(54) INTEGRATED RESEARCH AND DEVELOPMENT SYSTEM FOR HIGH-THROUGHPUT PREPARATION AND STATISTICAL MAPPING CHARACTERIZATION OF MATERIALS

(71) Applicant: NCS Testing Technology CO.,LTD, Beijing (CN)

(72) Inventors: Lei Zhao, Beijing (CN); Haizhou Wang, Beijing (CN); Lixia Yang, Beijing (CN); Lei Yu, Beijing (CN); Xuebin Chen, Beijing (CN); Hui Wang, Beijing (CN); Xuejing Shen, Beijing (CN); Yunhai Jia, Beijing (CN); Dongling Li, Beijing (CN); Xing Yu, Beijing (CN)

(73) Assignee: NCS Testing Technology CO., LTD, Beijing (CN)

( * ) Notice: Subject to any disclaimer, the term of this patent is extended or adjusted under 35 U.S.C. 154(b) by 587 days.

(21) Appl. No.: 18/116,279

(22) Filed: Mar. 1, 2023

(65) Prior Publication Data
US 2023/0205175 A1    Jun. 29, 2023

(30) Foreign Application Priority Data
Jan. 28, 2023    (CN) .......................... 202310042129.8

(51) Int. Cl.
G05B 19/4099    (2006.01)
(52) U.S. Cl.
CPC .................. *G05B 19/4099* (2013.01); *G05B 2219/49023* (2013.01)
(58) Field of Classification Search
CPC ...... G05B 19/4099; G05B 2219/49023; B22F 3/15; B22F 10/80; B33Y 30/00;
(Continued)

(56) References Cited

U.S. PATENT DOCUMENTS

2006/0085083 A1    4/2006    Congel et al.
2010/0057497 A1    3/2010    Chamberlain et al.
(Continued)

FOREIGN PATENT DOCUMENTS

CN    104535737 A  *    4/2015

OTHER PUBLICATIONS

Liu et al., "Machine learning in materials genome initiative: A review", Journal of Materials Science & Technology 57 (2020) 113-122 (Year: 2020).*

*Primary Examiner* — Thomas C Lee
*Assistant Examiner* — Michael Tang
(74) *Attorney, Agent, or Firm* — Zhigang Ma

(57) ABSTRACT

The present invention discloses an integrated research and development system for high-throughput preparation and statistical mapping characterization of materials, comprising: a high-throughput preparation module, a high-throughput characterization module, an automatic control module and a statistical mapping data processing module; the high-throughput preparation module is used for preparing a multi-component combinatorial-sample; the high-throughput characterization module comprises a plurality of different high-throughput characterization devices; the automatic control module comprises a special sample box, a sample moving platform, an intelligent mechanical arm and a synchronous control system; and the statistical mapping data processing module is used for constructing a statistical mapping constitutive model corresponding to position mapping according to the composition, microstructure and performance data of the combinatorial-sample. The present invention integrates multiple functions, has high automatic control level, improves the experimental speed and experimental efficiency.

4 Claims, 1 Drawing Sheet

(58) Field of Classification Search
CPC ....... B33Y 50/00; B29C 64/386; G16C 60/00; G16C 20/70
USPC ........................................................ 700/119
See application file for complete search history.

(56) References Cited

U.S. PATENT DOCUMENTS

2015/0325141 A1   11/2015  Saunders
2019/0176335 A1*  6/2019  Shivaram ............... B25J 9/1692
2023/0305030 A1*  9/2023  Silbert ............. G01N 35/00732

* cited by examiner

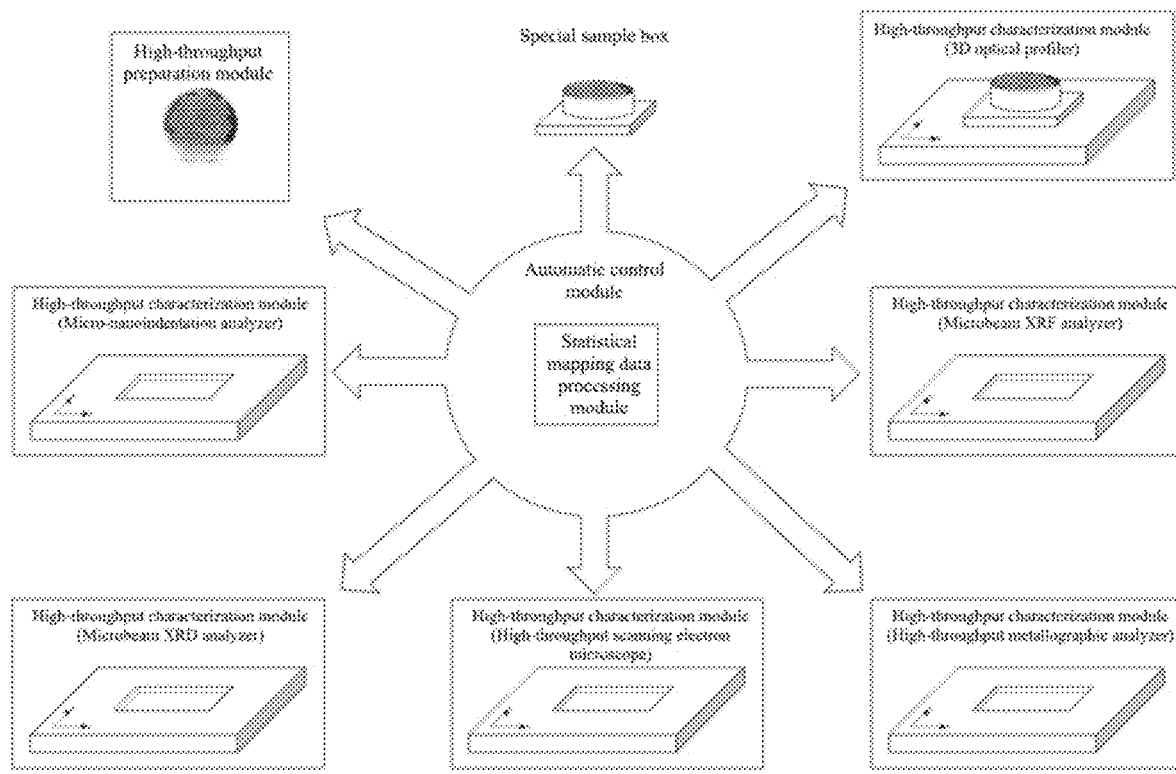

INTEGRATED RESEARCH AND DEVELOPMENT SYSTEM FOR HIGH-THROUGHPUT PREPARATION AND STATISTICAL MAPPING CHARACTERIZATION OF MATERIALS

TECHNICAL FIELD

The present invention relates to the technical field of high-throughput characterization of materials, and particularly relates to an integrated research and development system for high-throughput preparation and statistical mapping characterization of materials.

BACKGROUND

Material genome engineering is a new material research and development mode based on deep integration and collaborative innovation of "rational design, high-efficiency experiments and big data technologies", the essence of which is a data-driven research and development mode. Machine learning based on big data is the core to realize the rational design of new materials, and high-efficiency experiment is an important means to acquire big data. At present, many high-throughput preparation technologies and high-throughput characterization technologies have been developed to achieve high-efficiency experiments, which provides strong support for acquiring a large amount of valid experimental data. However, the experiment process at the present stage still needs a lot of manual intervention, which results in low experimental speed and efficiency and easily causes artificial misleading of data. Therefore, an automatic high-throughput experiment system is urgently needed.

SUMMARY

The purpose of the present invention is to provide an integrated research and development system for high-throughput preparation and statistical mapping characterization of materials, which can realize automatic high-throughput preparation of combinatorial-sample of target material systems, automatic high-throughput characterization of the prepared combinatorial-sample, automatic data acquisition and machine learning, and prediction and iteration of new materials based on an optimization model, minimize manual operation in the experimental process, improve the experimental speed and experimental efficiency, accelerate the acquisition of a large amount of valid and reliable data, and further speed up the research and development of new materials.

To achieve the above purpose, the present invention provides the following solution:

An integrated research and development system for high-throughput preparation and statistical mapping characterization of materials, comprising a statistical mapping data processing module, and a high-throughput preparation module, a high-throughput characterization module and an automatic control module which are connected with the statistical mapping data processing module;

The high-throughput preparation module is used for realizing one-time preparation of a multi-component combinatorial-sample with a regular array structure;

The high-throughput characterization module comprises a plurality of different high-throughput characterization devices used for respectively acquiring the composition, structure, performance and three-dimensional morphology data of the combinatorial-sample;

The automatic control module comprises a special sample box, a sample moving platform, an intelligent mechanical arm and a synchronous control system, wherein the special sample box is used for holding the combinatorial-sample, the sample moving platform is used for moving the special sample box, the intelligent mechanical arm is used for realizing the automatic clamping, moving, picking and placing of the special sample box, and the synchronous control system is used for synchronizing the sample position information of each high-throughput characterization device, controlling the intelligent mechanical arm to pick the special sample box and controlling the start, stop and data storage and transmission of each high-throughput characterization device;

The statistical mapping data processing module is used for realizing sample information input, clustering storage of data information acquired by each high-throughput characterization device, corresponding processing of position mapping among data parameters, construction of a statistical mapping constitutive model of composition, microstructure, performance and position parameters, big data machine learning based on the constitutive model, intelligent optimization of the constitutive model and iteration and prediction of new material systems.

Further, the high-throughput preparation module is a 3D printing or hot isostatic pressing high-throughput preparation module.

Further, the combinatorial-sample comprises not less than 100 components, each of which has the material size in millimeters.

Further, the plurality of different high-throughput characterization devices comprise a 3D optical profiler, a microbeam XRF analyzer, a high-throughput metallographic analyzer, a high-throughput scanning electron microscope, a microbeam XRD analyzer and a micro-nanoindentation analyzer, wherein the 3D optical profiler is used for measuring three-dimensional coordinates x, y and z of each point on the combinatorial-sample, the three-dimensional coordinates are used for subsequent sample location on each high-throughput characterization device, the microbeam XRF analyzer is used for measuring the composition of the combinatorial-sample, the high-throughput metallographic analyzer is used for measuring the metallographic structure of the combinatorial-sample, the high-throughput scanning electron microscope is used for measuring the microstructure of the combinatorial-sample, the microbeam XRD analyzer is used for measuring the phase structure of the combinatorial-sample, and the micro-nanoindentation analyzer is used for measuring the mechanical properties of hardness, elastic modulus, yield strength and tensile strength of the combinatorial-sample.

Further, the base of the special sample box is a cuboid.

Further, the sample moving platform is provided with a groove of the same size as the base of the special sample box, which is used for holding the special sample box; and each high-throughput characterization device is provided with the same sample moving platform.

Further, the synchronous control system synchronizes the sample position information of each high-throughput characterization device through the three-dimensional coordinate parameters x, y and z of the sample acquired by the 3D optical profiler, the x and y coordinates define the two-dimensional plane position information of each point on the combinatorial-sample, and the z coordinate defines the height information of each point; the synchronous control system controls the intelligent mechanical arm to pick the special sample box and controls the start, stop and data storage and transmission of each high-throughput characterization device; and each synchronous control system is used for automatic sample analysis in two modes: continuous scanning analysis and collection within the sample range and array arbitrary point analysis and collection.

According to the specific embodiments provided by the present invention, the present invention discloses the following technical effects: the integrated research and development system for high-throughput preparation and statistical mapping characterization of materials provided by the present invention mainly comprises a statistical mapping data processing module, a high-throughput preparation module, a high-throughput characterization module and an automatic control module, the high-throughput preparation module is used for realizing one-time preparation and synthesis of a multi-component combinatorial-sample with a regular array structure, the automatic control module comprises a special sample box, a sample moving platform, an intelligent mechanical arm and a synchronous control system, the sample moving platform is used for moving the special sample box, the intelligent mechanical arm is used for realizing the automatic clamping, moving, picking and placing of the special sample box, and the synchronous control system is used for synchronizing the sample position information of each high-throughput characterization device, controlling the intelligent mechanical arm to pick the special sample box and controlling the start, stop and data storage and transmission of each high-throughput characterization device; and the statistical mapping data processing module is used for realizing sample information input, clustering storage of data information acquired by each high-throughput characterization device, corresponding processing of position mapping among data parameters, construction of a statistical mapping constitutive model of composition, microstructure, performance and position parameters, big data machine learning based on the constitutive model, intelligent optimization of the constitutive model and iteration and prediction of new material systems. It can be seen that the research and development system proposed in the present application has various functions, realizes the integration of high-throughput preparation and statistical mapping characterization of materials, has high automatic control level, avoids the problems of human error and low labor efficiency, is conducive to improving the experimental speed and experimental efficiency, can quickly acquire a large amount of valid and reliable sample data, and provides reliable technical support for the research and development of new materials.

DESCRIPTION OF DRAWINGS

To more clearly describe the technical solutions in the embodiments of the present invention or in prior art, the drawings required to be used in the embodiments will be simply presented below. Apparently, the drawings in the following description are merely some embodiments of the present invention, and for those skilled in the art, other drawings can also be obtained according to these drawings without contributing creative labor.

FIG. 1 is a structural schematic diagram of an integrated research and development system for high-throughput preparation and statistical mapping characterization of materials provided by the present invention.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The purpose of the present invention is to provide an integrated research and development system for high-throughput preparation and statistical mapping characterization of materials, which can realize automatic high-throughput preparation of combinatorial-sample of target material systems, automatic high-throughput characterization of the prepared combinatorial-sample, automatic data acquisition and machine learning, and prediction and iteration of new materials based on an optimization model, minimize manual operation in the experimental process, improve the experimental speed and experimental efficiency, accelerate the acquisition of a large amount of valid and reliable data, and further speed up the research and development of new materials.

To make the above-mentioned purpose, features and advantages of the present invention more clear and understandable, the present invention will be further described below in detail in combination with the drawings and specific embodiments.

As shown in FIG. 1, the integrated research and development system for high-throughput preparation and statistical mapping characterization of materials provided by the present invention comprises: a statistical mapping data processing module, and a high-throughput preparation module, a high-throughput characterization module and an automatic control module which are connected with the statistical mapping data processing module;

The high-throughput preparation module is used for realizing one-time preparation of a multi-component combinatorial-sample with a regular array structure; and the high-throughput preparation module can be a 3D printing or hot isostatic pressing high-throughput preparation module.

Exemplarily, the high-throughput preparation module can be a "High-throughput 3D Printing System for Preparing Small-size Multi-component Samples" disclosed in the patent CN115229217A. The high-throughput 3D printing system is a desktop device, which is not only small in size and low in powder consumption, but also suitable for the preparation of small-size multi-component samples in the scientific research laboratory, and adopts step-type powder mixing (non-continuous powder delivery) without mixed powder which has intermediate components in a variable proportion and dynamically changing, thus reducing wastes of raw materials and improving the preparation efficiency. The combinatorial-sample comprises not less than 100 components, each of which has the material size in millimeters, facilitating subsequent automatic high-throughput characterization.

Exemplarily, the high-throughput preparation module can also be a "Hot Isostatic Pressing High-throughput Micromanufacturing Method for Composite Materials and Coating Die Thereof" disclosed in the patent CN 109759594 B, which adopts the hot isostatic pressing process of powder metallurgy, has the characteristics of high sintering speed, high pressed density, good thermal diffusivity, short production cycle and low material loss, and realizes one-time rapid preparation of a small-size block combinatorial-sample with multiple independent components.

The high-throughput characterization module comprises a plurality of different high-throughput characterization devices used for realizing acquisition of the composition, microstructure, performance and three-dimensional morphology data of the combinatorial-sample. The plurality of different high-throughput characterization devices comprise a 3D optical profiler, a microbeam XRF analyzer, a high-throughput metallographic analyzer, a high-throughput scanning electron microscope, a microbeam XRD analyzer and a micro-nanoindentation analyzer, wherein the 3D optical profiler is used for measuring three-dimensional coordinates x, y and z of each point on the combinatorial-sample and can be used for establishing a coordinate database about the combinatorial-sample, the three-dimensional coordinates are used for subsequent uniform sample location on each high-throughput characterization device, the microbeam XRF analyzer is used for measuring the composition of the combinatorial-sample, the high-throughput metallographic analyzer is used for measuring the metallographic structure of the combinatorial-sample, the high-throughput scanning electron microscope is used for measuring the microstructure of the combinatorial-sample, the microbeam XRD analyzer is used for measuring the phase structure of the combinatorial-sample, and the micro-nanoindentation analyzer is used for measuring the mechanical properties of hardness, elastic modulus, yield strength and tensile strength of the combinatorial-sample.

The automatic control module comprises a special sample box, a sample moving platform, an intelligent mechanical arm and a synchronous control system, wherein the special sample box is used for holding the combinatorial-sample, and exemplarily, the base of the special sample box is a cuboid, and the special sample box can ensure that the surface of the sample held therein is parallel to the bottom surface and the array direction is consistent with the moving direction of the platform.

The sample moving platform is used for moving the special sample box and provided with a groove of the same size as the base of the special sample box, which is used for holding the special sample box; and each high-throughput characterization device is provided with the same sample moving platform so that the special sample box has the same coordinates relative to the sample moving platform to ensure high-precision synchronous movement and location of different devices, facilitating establishment of the mapping relationship between the parameters of the composition, microstructure, performance and three-dimensional morphology data of the combinatorial-sample in the same coordinate position;

The intelligent mechanical arm is used for realizing the functions of automatic clamping, moving, picking and placing of the special sample box;

The synchronous control system is used for synchronizing the sample position information of each high-throughput characterization device and automatically controlling the start, stop and data transmission of each characterization device and the movement of the intelligent mechanical arm; and specifically, the synchronous control system synchronizes the sample position information of each high-throughput characterization device through the three-dimensional coordinate parameters x, y and z of the sample acquired by the 3D optical profiler, the x and y coordinates define the two-dimensional plane position information of each point on the combinatorial-sample, and the z coordinate defines the height information of each point to ensure the precise focusing of the combinatorial-sample on each point; After the 3D optical profiler completes scanning, the synchronous control system controls the intelligent mechanical arm to pick and place the special sample box on the sample moving platform of the microbeam XRF analyzer, controls the microbeam XRF analyzer to automatically start detection and automatically stop and store and transmit data after the end of the detection, controls the intelligent mechanical arm to pick and place the special sample box on the next analytical instrument, and then repeats the above operation until the whole analysis process is complete. The synchronous control system can realize automatic sample analysis in two modes: one is continuous scanning analysis and collection within the sample range, which can scan each point, be suitable for non-combinatorial-sample and scan the whole range of the conventional samples at high precision, and the other is array arbitrary point analysis and collection, which is suitable for combinatorial-sample and can improve the scanning and analysis efficiency by means of array collection of micro-area average values.

The statistical mapping data processing module is used for realizing sample information input, clustering storage of data information acquired by each high-throughput characterization device, corresponding processing of position mapping among data parameters, construction of a statistical mapping constitutive model of composition, microstructure, performance and position data parameters, big data machine learning based on the constitutive model, intelligent optimization of the constitutive model and iteration and prediction of new material systems.

The specific solutions of corresponding processing of position mapping among data parameters and construction of a statistical mapping constitutive model of composition, microstructure, performance and position data parameters can refer to a "Mapping Characterization Method for Statistical Distribution Analysis of Original Positions of Materials" disclosed in the patent CN104535737B to establish a relational database of composition, microstructure and mechanical properties and construct a statistical mapping constitutive model of composition, microstructure, performance and position data parameters so as to conduct mapping characterization on in-situ statistical distribution analysis of material micro-areas. The specific solution of big data machine learning based on the constitutive model can refer to a "Micro-sized Second-phase Quantitative Statistical Characterization Method for Aluminum Alloy Based on Deep Learning" disclosed in the patent CN112489039B, a "Full-view-field Quantitative Statistical Distribution Characterization Method for Microstructure in Metal Materials" disclosed in the patent CN112395932B and so on. The above patents are previous basic patent documents of the applicant, and the present invention is an improvement of an integrated research and development system based on the basic patent documents.

The implementation process of the integrated research and development system for high-throughput preparation and statistical mapping characterization of materials provided by the present invention is as follows:

S1: preparing a multi-component combinatorial-sample by the high-throughput preparation device through 3D printing or hot isostatic pressing, polishing and metallographically etching the surface of the sample, and then fixing the sample in the special sample box according to the travel direction of the moving platform;

S2: using the intelligent mechanical arm to place the special sample box into the groove of the sample moving platform matched with the 3D optical profiler, scanning the whole range of the sample after initialization of the sample moving platform, and acquiring the x, y and z coordinates of each position of the combinatorial-sample; and at this moment, the sample can be set to be subjected to subsequent high-throughput characterization in a continuous surface scanning mode or artificially selected array mode;

S3: picking the special sample box onto the sample moving platform of the microbeam XRF analyzer by the intelligent mechanical arm, and conducting high-throughput automatic testing of components in the x, y and z coordinates acquired by the 3D optical profiler according to the set analysis mode; and after testing, the component and position data are automatically transmitted to the statistical mapping data processing module;

S4: similarly, picking the special sample box onto the moving platforms of the high-throughput characterization devices of the high-throughput metallographic analyzer, the high-throughput scanning electron microscope, the microbeam XRD analyzer and the micro-nanoindentation analyzer by the intelligent mechanical arm in sequence, and conducting automatic testing of the parameters such as metallographic structure, microstructure, phase structure and mechanical properties of the sample in the same x, y and z coordinates; and after testing, the component and position data are automatically transmitted to the statistical mapping data processing module;

S5: using the statistical mapping data processing module to construct a statistical mapping constitutive model of composition, microstructure, performance and position data parameters corresponding to position mapping according to the composition, microstructure and performance data in the each piece of position information of the sample, and carrying out machine learning computing to optimize the constitutive model and predict new material composition systems meeting the design requirements.

The integrated research and development system for high-throughput preparation and statistical mapping characterization of materials can be continuously developed iteratively.

In conclusion, the integrated research and development system for high-throughput preparation and statistical mapping characterization of materials provided by the present invention mainly comprises a statistical mapping data processing module, a high-throughput preparation module, a high-throughput characterization module and an automatic control module, the high-throughput preparation module is used for realizing one-time preparation of a multi-component combinatorial-sample with a regular array structure, the automatic control module comprises a special sample box, a sample moving platform, an intelligent mechanical arm and a synchronous control system, the sample moving platform is used for moving the special sample box, the intelligent mechanical arm is used for realizing the automatic clamping, moving, picking and placing of the special sample box, and the synchronous control system is used for synchronizing the sample position information of each high-throughput characterization device and automatically controlling the start, stop and data transmission of each characterization device and the movement of the intelligent mechanical arm; and the statistical mapping data processing module is used for realizing sample information input, clustering storage of data information acquired by each high-throughput characterization device, corresponding processing of position mapping among data parameters, construction of a statistical mapping constitutive model of composition, microstructure, performance and position data parameters, big data machine learning based on the constitutive model, intelligent optimization of the constitutive model and iteration and prediction of new material systems. It can be seen that the research and development system proposed in the present application has various functions, realizes the integration of high-throughput preparation and statistical mapping characterization of materials, has high automatic control level, avoids the problems of human error and low labor efficiency, is conducive to improving the experimental speed and experimental efficiency, can quickly acquire a large amount of valid and reliable sample data, and provides reliable technical support for the research and development of new materials.

Specific individual cases are applied herein for elaborating the principle and embodiments of the present invention. The illustration of the above embodiments is merely used for helping to understand the method and the core thought of the present invention. Meanwhile, for those ordinary skilled in the art, specific embodiments and the application scope may be changed in accordance with the thought of the present invention. In conclusion, the contents of the description shall not be interpreted as a limitation to the present invention.

What is claimed is:

1. An integrated research and development system for preparation and statistical mapping characterization of materials, comprising a statistical mapping data processing module, and a preparation module, a characterization module and an automatic control module which are connected with the statistical mapping data processing module;
   the preparation module is used for realizing one-time preparation of a multi-component combinatorial-sample with an array structure;
   the characterization module comprises a plurality of different characterization devices used for respectively acquiring the composition, microstructure, performance and three-dimensional morphology data of the combinatorial-sample; and the plurality of different characterization devices comprise a 3D optical profiler, a microbeam XRF analyzer, a metallographic analyzer, a scanning electron microscope, a microbeam XRD analyzer and a micro-nanoindentation analyzer;
   the 3D optical profiler is used for measuring three-dimensional coordinates x, y and z of each point on the combinatorial-sample, the three-dimensional coordinates are used for subsequent sample location on each characterization device, the microbeam XRF analyzer is used for measuring the composition of the combinatorial-sample, the metallographic analyzer is used for measuring the metallographic structure of the combinatorial-sample, the scanning electron microscope is used for measuring the microstructure of the combinatorial-sample, the microbeam XRD analyzer is used for measuring the phase structure of the combinatorial-sample, and the micro-nanoindentation analyzer is used for measuring the mechanical properties of hardness, elastic modulus, yield strength and tensile strength of the combinatorial-sample;
   the automatic control module comprises a sample box, a sample moving platform, an intelligent mechanical arm and a synchronous control system, wherein the sample box is used for holding the combinatorial-sample, the sample moving platform is used for moving the sample box, the intelligent mechanical arm is used for realizing the automatic clamping, moving, picking and placing of the sample box, and the synchronous control system is used for synchronizing the sample position information of each characterization device and automatically controlling the start, stop and data transmission of each characterization device and the movement of the intelligent mechanical arm; the sample moving platform is provided with a groove of the same size as the base of the sample box, which is used for holding the sample box; and each characterization device is provided with the same sample moving platform;

the synchronous control system synchronizes the sample position information of each high-throughput characterization device through the three-dimensional coordinate parameters x, y and z of the sample acquired by the 3D optical profiler, the x and y coordinates define the two-dimensional plane position information of each point on the combinatorial-sample, and the z coordinate defines the height information of each point; the synchronous control system is used for controlling the intelligent mechanical arm to pick the sample box and controlling the start, stop and data storage and transmission of each characterization device; and the synchronous control system is used for automatic sample analysis in two modes: continuous scanning analysis and collection within the sample range and array arbitrary point analysis and collection;

the statistical mapping data processing module is used for realizing sample information input, clustering storage of data information acquired by each characterization device, corresponding processing of position mapping among data parameters, construction of a statistical mapping constitutive model of composition, microstructure, performance and position data parameters, big data machine learning based on the constitutive model, intelligent optimization of the constitutive model and iteration and prediction of new material systems.

2. The integrated research and development system for preparation and statistical mapping characterization of materials according to claim 1, wherein the preparation module is a 3D printing or hot isostatic pressing preparation module.

3. The integrated research and development system for preparation and statistical mapping characterization of materials according to claim 1, wherein the combinatorial-sample comprises not less than 100 components, each of which has the material size in millimeters.

4. The integrated research and development system for preparation and statistical mapping characterization of materials according to claim 1, wherein the base of the sample box is a cuboid.

* * * * *